United States Patent
Matsuoka et al.

(10) Patent No.: US 8,156,752 B2
(45) Date of Patent: Apr. 17, 2012

(54) AIR CONDITIONING SYSTEM

(75) Inventors: Hiromune Matsuoka, Sakai (JP);
Toshiyuki Kurihara, Sakai (JP)

(73) Assignee: Daikin Industries, Ltd., Osaka (JP)

( * ) Notice: Subject to any disclaimer, the term of this patent is extended or adjusted under 35 U.S.C. 154(b) by 746 days.

(21) Appl. No.: 12/373,264

(22) PCT Filed: Jul. 20, 2007

(86) PCT No.: PCT/JP2007/064308
§ 371 (c)(1),
(2), (4) Date: Jan. 9, 2009

(87) PCT Pub. No.: WO2008/013103
PCT Pub. Date: Jan. 31, 2008

(65) Prior Publication Data
US 2009/0288437 A1    Nov. 26, 2009

(30) Foreign Application Priority Data

Jul. 24, 2006    (JP) ................ 2006-200634

(51) Int. Cl.
*F25B 27/00*    (2006.01)
(52) U.S. Cl. ........................... 62/238.7; 62/435
(58) Field of Classification Search ............. 62/238.6, 62/238.7, 196.4, 324.1, 160, 434, 185, 513, 62/335, 435; 165/201, 263, 264
See application file for complete search history.

(56) References Cited

U.S. PATENT DOCUMENTS

| | | | |
|---|---|---|---|
| 3,581,519 A * | 6/1971 | Garrett et al. | 62/468 |
| 3,633,377 A * | 1/1972 | Quick | 62/192 |
| 4,589,263 A * | 5/1986 | DiCarlo et al. | 62/193 |
| 4,676,072 A * | 6/1987 | Higuchi | 62/175 |
| 4,878,357 A * | 11/1989 | Sekigami et al. | 62/160 |
| 5,150,582 A * | 9/1992 | Gotou | 62/155 |
| 5,279,131 A * | 1/1994 | Urushihata et al. | 62/324.1 |
| 5,381,671 A * | 1/1995 | Saito et al. | 62/430 |
| 5,490,399 A * | 2/1996 | Sada | 62/510 |

(Continued)

FOREIGN PATENT DOCUMENTS

| | | |
|---|---|---|
| JP | 59-69674 A | 4/1984 |
| JP | 2003-139422 A | 5/2003 |
| JP | 2005-257181 A | 9/2005 |

OTHER PUBLICATIONS

Japanese Office Action of corresponding Japanese Patent Application No. 2006-200634 dated Mar. 1, 2011.

*Primary Examiner* — Mohammad Ali
(74) *Attorney, Agent, or Firm* — Global IP Counselors

(57) ABSTRACT

An air conditioning system includes a compressor, a first heat source-side heat exchanger for heating or cooling a refrigerant, a second heat source-side heat exchanger for exchanging heat between the refrigerant and a heat delivery medium, a first utilization-side heat exchanger for performing indoor cooling by using the refrigerant cooled in the first heat source-side heat exchanger, a second utilization-side heat exchanger for performing indoor heating by using the heat delivery medium subjected to heat exchange in the second heat source-side heat exchanger, and a connection mechanism. The connection mechanism can switch between a first connection state in which refrigerant is circulated sequentially through the compressor, the first heat source-side heat exchanger, the first utilization-side heat exchanger and the compressor; and a second connection state in which the refrigerant is circulated sequentially through the compressor, the second heat source-side heat exchanger, the first heat source-side heat exchanger, and the compressor.

12 Claims, 5 Drawing Sheets

U.S. PATENT DOCUMENTS

| | | | |
|---|---|---|---|
| 5,548,968 A * | 8/1996 | Sada | 62/175 |
| 5,673,570 A * | 10/1997 | Sada | 62/468 |
| 5,996,363 A * | 12/1999 | Kurachi et al. | 62/192 |
| 5,996,368 A * | 12/1999 | Kim | 62/324.6 |
| 6,604,371 B2 * | 8/2003 | Ueno | 62/193 |
| 6,941,767 B2 * | 9/2005 | Matsuoka et al. | 62/470 |
| 6,986,259 B2 * | 1/2006 | Takegami et al. | 62/84 |
| 7,013,666 B2 * | 3/2006 | Park et al. | 62/324.6 |
| 7,222,491 B2 * | 5/2007 | Moriwaki | 62/84 |
| 7,614,249 B2 * | 11/2009 | Hu | 62/324.1 |

* cited by examiner

AIR CONDITIONING SYSTEM

CROSS-REFERENCE TO RELATED APPLICATIONS

This U.S. National stage application claims priority under 35 U.S.C. §119(a) to Japanese Patent Application No. 2006-200634, filed in Japan on Jul. 24, 2006, the entire contents of which are hereby incorporated herein by reference.

TECHNICAL FIELD

The present invention relates to an air conditioning system, and particularly to an air conditioning system capable of using a refrigeration cycle in which a refrigerant is compressed to critical pressure or greater, and switching between indoor heating and cooling.

BACKGROUND ART

In the prior art, air conditioners are used that can switch between indoor heating and cooling. An example of such an air conditioner is a so-called split-type air conditioner in which a refrigerant circuit is configured by connecting a heat source unit having a compressor, a four-way switching valve, and a heat source-side heat exchanger, and a utilization unit having an expansion valve and a utilization-side heat exchanger, the connection being established via two refrigerant communication pipes.

In a split-type air conditioner capable of switching between indoor heating and cooling, the use of carbon dioxide, which has little effect on the environment, is considered desirable as the refrigerant sealed within the refrigerant circuit instead of a CFC refrigerant, an HCFC refrigerant, or an HFC refrigerant, which have been heretofore used.

However, in the air conditioner described above, when carbon dioxide is used as the refrigerant, the carbon dioxide as the refrigerant is compressed by the compressor until critical pressure or greater is reached. During the cooling operation, a refrigeration cycle operation is performed in which the refrigerant compressed to critical pressure or greater in the compressor flows to the heat source-side heat exchanger via the four-way switching valve, the refrigerant is cooled in the heat source-side heat exchanger, the refrigerant is sent to the expansion valve via first refrigerant communication pipe, the refrigerant is reduced in pressure until a low pressure is reached, the refrigerant flows to the utilization-side heat exchanger, and the refrigerant is heated in the utilization-side heat exchanger, after which the refrigerant returns to the compressor via the second refrigerant communication pipe and the four-way switching valve. During the heating operation, a refrigeration cycle is performed in which the refrigerant compressed to critical pressure or greater in the compressor flows to the utilization-side heat exchanger via the four-way switching valve and the second refrigerant communication pipe, the refrigerant is cooled in the utilization-side heat exchanger, the refrigerant is sent to the expansion valve, the refrigerant is reduced in pressure until a low pressure is reached, the refrigerant flows to the heat source-side heat exchanger via the first refrigerant communication pipe, and the refrigerant is heated in the heat source-side heat exchanger, after which the refrigerant returns to the compressor via the four-way switching valve. Specifically, during the cooling operation, carbon dioxide compressed to critical pressure or greater passes through a portion leading from the compressor up to the expansion valve via the four-way switching valve, the heat source-side heat exchanger, and the first refrigerant communication pipe; and during the heating operation, the carbon dioxide compressed to critical pressure or greater passes through a portion leading from the compressor up to the expansion valve via the four-way switching valve, the second refrigerant communication pipe, and the utilization-side heat exchanger.

Thus, when an air conditioner is configured that can use a refrigeration cycle in which the refrigerant is compressed to critical pressure or greater and that can switch between indoor heating and cooling, substantially all of the components constituting the refrigerant circuit, including the refrigerant communication pipes, must be designed at a maximum pressure determined based on the pressure to which the refrigerant is compressed by the compressor, bringing about the problems of increased costs of materials due to an increase in the thickness of the refrigerant communication pipes, reduced workability due to increased thickness, and further increased costs due to reduced workability.

In Japanese Laid-open Patent Application No. 2003-139422, a procedure is disclosed in which the expansion valve is connected to the heat source unit side, the refrigerant cooled in the heat source-side heat exchanger is reduced in pressure by the expansion valve, and the refrigerant is then sent to the utilization-side heat exchanger via a first refrigerant communication pipe, thereby suppressing increases in the thickness of the refrigerant communication pipes.

SUMMARY OF THE INVENTION

However, the procedure in Japanese Laid-open Patent Application No. 2003-139422 ultimately can be applied only to a split-type air conditioner for cooling only, and cannot be applied to a split-type air conditioner capable of switching between indoor heating and cooling.

An object of the present invention is to provide an air conditioning system capable of using a refrigeration cycle in which a refrigerant is compressed to critical pressure or greater, and switching between indoor heating and cooling, wherein an increase in the thickness of the refrigerant communication pipes is reduced.

The air conditioning system according to a first aspect of the present invention is an air conditioning system capable of switching between indoor heating and cooling; the air conditioning system comprising a compressor for compressing a refrigerant to critical pressure or greater, a first heat source-side heat exchanger for heating or cooling the refrigerant, a second heat source-side heat exchanger for exchanging heat between the refrigerant and a heat delivery medium, a first utilization-side heat exchanger capable of performing indoor cooling by using the refrigerant cooled in the first heat source-side heat exchanger, a second utilization-side heat exchanger capable of performing indoor heating by using the heat delivery medium subjected to heat exchange in the second heat source-side heat exchanger, and a connection mechanism. The connection mechanism can switch between a first connection state in which the refrigerant discharged from the compressor is circulated sequentially through the first heat source-side heat exchanger, the first utilization-side heat exchanger, and the compressor; and a second connection state in which the refrigerant discharged from the compressor is circulated sequentially through the second heat source-side heat exchanger, the first heat source-side heat exchanger, and the compressor. The compressor, the first heat source-side heat exchanger, the second heat source-side heat exchanger, and the connection mechanism constitute a heat source unit; the first utilization-side heat exchanger constitutes a utilization unit; and the utilization unit and heat source unit are connected via refrigerant communication pipes.

In this air conditioning system, switching the connection mechanism to the first connection state enables indoor cooling to be performed while the refrigerant goes back and forth between the heat source unit and the utilization unit via the refrigerant communication pipes, and switching the connection mechanism to the second connection state enables indoor heating to be performed while the heat delivery medium subjected to heat exchange with the refrigerant goes back and forth between the heat source unit and the second utilization-side heat exchanger. Therefore, the high-pressure refrigerant compressed to critical pressure or greater in the compressor does not need to be sent to the refrigerant communication pipes both even when indoor cooling is being performed and when indoor heating is being performed, and an increase in the thickness of the refrigerant communication pipes can be reduced.

Cost increases and loss of workability due to increased thickness in the refrigerant communication pipes can thereby be prevented, cost increases due to loss of workability can also be prevented, and, moreover, comfortable heating can be achieved using the heat delivery medium when indoor heating is being performed.

The air conditioning system according to a second aspect of the present invention is the air conditioning system according to the first aspect, wherein the connection mechanism has a first connection mechanism and a second connection mechanism. The first connection mechanism is capable of switching between a first switching state in which the discharge side of the compressor and one end of the first heat source-side heat exchanger are connected and the intake side of the compressor and one end of the first utilization-side heat exchanger are connected in the first connection state, and a second switching state in which the discharge side of the compressor and one end of the second heat source-side heat exchanger are connected and the intake side of the compressor and the one end of the first heat source-side heat exchanger are connected in the second connection state. The second connection mechanism is capable of switching between a first pressure reduction state in which the refrigerant cooled in the first heat source-side heat exchanger is reduced in pressure and sent to the first utilization-side heat exchanger in the first connection state, and a second pressure reduction state in which the refrigerant subjected to heat exchange in the second heat source-side heat exchanger is reduced in pressure and sent to the first heat source-side heat exchanger in the second connection state.

The air conditioning system according to a third aspect of the present invention is the air conditioning system according to the second aspect, wherein it is possible to switch the first connection mechanism to the first switching state and to switch the second connection mechanism to a third pressure reduction state in which the refrigerant cooled in the first heat source-side heat exchanger is reduced in pressure and sent to the first utilization-side heat exchanger, and in which the refrigerant subjected to heat exchange in the second heat source-side heat exchanger is reduced in pressure and sent to the first heat source-side heat exchanger.

In this air conditioning system, since it is possible to switch the first connection mechanism to the first switching state and to switch the second connection mechanism to the third pressure reduction state in which the refrigerant cooled in the first heat source-side heat exchanger is reduced in pressure and sent to the first utilization-side heat exchanger and in which the refrigerant subjected to heat exchange in the second heat source-side heat exchanger is reduced in pressure and sent to the first heat source-side heat exchanger, it is possible to perform indoor cooling by using the first utilization-side heat exchanger, and also to perform indoor cooling by using the second utilization-side heat exchanger.

The air conditioning system according to a fourth aspect of the present invention is the air conditioning system according to any of the first through third aspects, wherein the heat delivery medium is water.

In this air conditioning system, since the heat delivery medium is water, water as the heat delivery medium subjected to heat exchange with the refrigerant in the second heat source-side heat exchanger can be used as a hot water supply when the connection mechanism is switched to the second connection state to perform the operation.

The air conditioning system according to a fifth aspect of the present invention is the air conditioning system according to any of the first through fourth aspects, wherein the refrigerant is carbon dioxide.

DETAILED DESCRIPTION OF THE INVENTION

Embodiments of an air conditioning system according to the present invention are described hereinbelow with reference to the drawings.

(1) Configuration of Air Conditioning System

Figure 1:
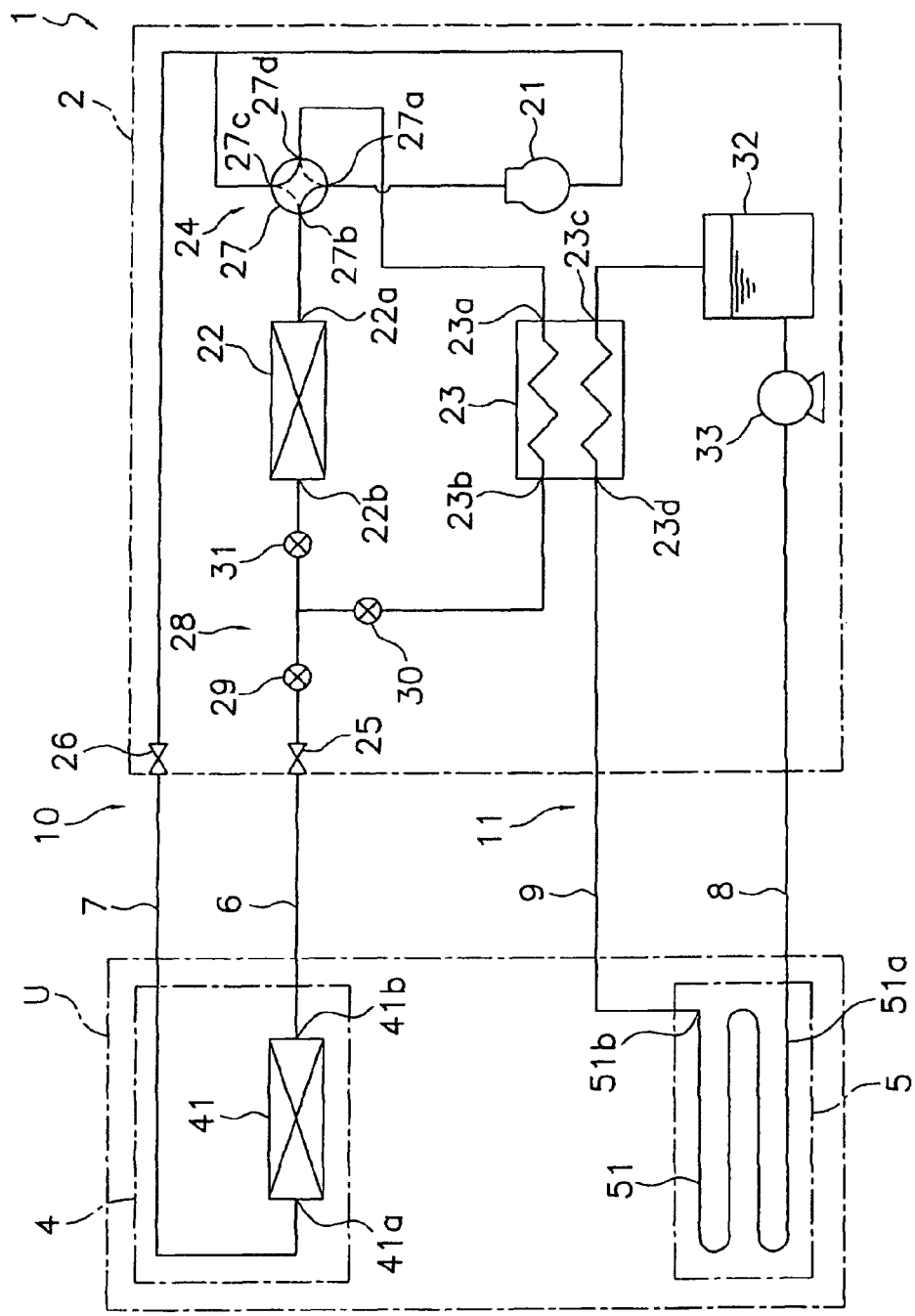
FIG. 1 is a schematic block diagram of an air conditioning system according to an embodiment of the present invention.

FIG. 1 is a schematic block diagram of an air conditioning system 1 according to an embodiment of the present invention. The air conditioning system 1 is an air conditioning system capable of using a refrigeration cycle in which a refrigerant is compressed to critical pressure or greater, and switching between indoor heating and cooling in a building U.

The air conditioning system 1 includes mainly a heat source unit 2, a utilization unit 4, an indoor heating unit 5, a refrigerant communication pipe 6 and a refrigerant communication pipe 7 as refrigerant communication pipes for connecting the heat source unit 2 and the utilization unit 4, and a medium communication pipe 8 and a medium communication pipe 9 as medium communication pipes for connecting the heat source unit 2 and the indoor heating unit 5. A refrigerant circuit 10 is configured by connecting the heat source unit 2 and utilization unit 4 via the refrigerant communication pipes 6, 7, and a heat delivery medium circuit 11 is configured by connecting the heat source unit 2 and indoor heating unit 5 via the medium communication pipes 8, 9.

<Refrigerant Circuit>

First, a refrigerant circuit 10 of the air conditioning system 1 will be described.

The refrigerant circuit 10 has mainly a compressor 21, a first heat source-side heat exchanger 22, a second heat source-side heat exchanger 23, a first utilization-side heat exchanger 41, a connection mechanism 24, shut-off valves 25, 26, and the refrigerant communication pipes 6, 7. The refrigerant circuit 10 is filled up with carbon dioxide as the refrigerant.

The compressor 21 is a compressor that is driven by a drive mechanism such as a motor to compress the low-pressure refrigerant to critical pressure or greater.

The first heat source-side heat exchanger 22 is a heat exchanger that heats or cools the refrigerant by exchanging heat between the refrigerant and air or water as a heat source.

The second heat source-side heat exchanger 23 is a heat exchanger for exchanging heat between the refrigerant and a heat delivery medium.

The first utilization-side heat exchanger 41 is a heat exchanger capable of cooling the room by using the refrigerant cooled in the first heat source-side heat exchanger, wherein one end 41a is connected to the refrigerant communication pipe 6 and the other end 41b is connected to the refrigerant communication pipe 7.

The connection mechanism 24 is capable of switching between a first connection state in which the refrigerant discharged from the compressor 21 is circulated through the first heat source-side heat exchanger 22, the first utilization-side heat exchanger 41, and the compressor 21 in the stated order, and a second connection state in which the refrigerant discharged from the compressor 21 is circulated through the second heat source-side heat exchanger 23, the first heat source-side heat exchanger 22, and the compressor 21 in the stated order. The connection mechanism 24 has mainly a four-way switching valve 27 as a first connection mechanism, and a second connection mechanism 28.

The four-way switching valve 27 as the first connection mechanism has a first port 27a connected to the discharge side of the compressor 21, a second port 27b connected to one end 22a of the first heat source-side heat exchanger 22, a third port 27c connected to the intake side of the compressor 21 and to the shut-off valve 26, and a fourth port 27d connected to one end 23a of the second heat source-side heat exchanger 23; and the four-way switching valve 27 is capable of switching between a first switching state (refer to the solid lines in the four-way switching valve 27 in FIG. 1) in which the first port 27a and second port 27b are communicated and the third port 27c and fourth port 27d are communicated, and a second switching state (refer to the dashed lines in the four-way switching valve 27 in FIG. 1) in which the first port 27a and fourth port 27d are communicated and the second port 27b and third port 27c are communicated. Specifically, the four-way switching valve 27 is capable of connecting the discharge side of the compressor 21 and the one end 22a of the first heat source-side heat exchanger 22, as well as connecting the intake side of the compressor 21 and the one end 41a of the first utilization-side heat exchanger 41 by switching to the first switching state; and also of connecting the discharge side of the compressor 21 and the one end 23a of the second heat source-side heat exchanger 23, as well as connecting the intake side of the compressor 21 and the one end 22a of the first heat source-side heat exchanger 22 by switching to the second switching state. The four-way switching valve 27 may be replaced as the first connection mechanism by providing a combination of a plurality of electromagnetic valves and three-way valves.

The second connection mechanism 28 has mainly a first expansion mechanism 29 connected between the shut-off valve 25 and the other end 22b of the first heat source-side heat exchanger 22, a second expansion mechanism 30 connected between the other end 22b of the first heat source-side heat exchanger 22 and the other end 23b of the second heat source-side heat exchanger 23, and a third expansion mechanism 31 connected between the other end 22b of the first heat source-side heat exchanger 22 and the expansion mechanisms 29, 30. In the present embodiment, electric expansion valves are used as the expansion mechanisms 29, 30, 31.

In the first connection state, the second connection mechanism 28 is capable of switching between a first pressure reduction state in which the second expansion mechanism 30 is fully closed and the first expansion mechanism 29 and third expansion mechanism 31 are opened, and a second pressure reduction state in which the first expansion mechanism 29 is fully closed and the second expansion mechanism 30 and third expansion mechanism 31 are opened. Specifically, the second connection mechanism 28 is capable of reducing the pressure of the refrigerant cooled in the first heat source-side heat exchanger 22 by using the first expansion mechanism 29 and third expansion mechanism 31 and sending the refrigerant to the first utilization-side heat exchanger 41 by setting the four-way switching valve 27 as the first connection mechanism to the first switching state and setting the second connection mechanism 28 to the first pressure reduction state (i.e., by setting the connection mechanism 24 to the first connection state), and also of reducing the pressure of the refrigerant subjected to heat exchange in the second heat source-side heat exchanger 23 by using the second expansion mechanism 30 and third expansion mechanism 31 and sending the refrigerant to the first heat source-side heat exchanger 22 by setting the four-way switching valve 27 as the first connection mechanism to the second switching state and setting the second connection mechanism 28 to the second pressure reduction state (i.e., by setting the connection mechanism 24 to the second connection state).

The shut-off valves 25, 26 are valves provided to the ports that connect to external devices or pipes (specifically, the refrigerant communication pipes 6, 7). The shut-off valve 25 is connected to the first expansion mechanism 29. The shut-off valve 26 is connected to the intake side of the compressor 21 and the third port 27c of the four-way switching valve 27.

The refrigerant communication pipes 6, 7 are refrigerant pipes that are mounted on-site when installed in the location where the air conditioning system 1 is installed.

As described below, since the refrigerant after being reduced in pressure by the second connection mechanism 28 flows into the refrigerant communication pipes 6, 7 and the first utilization-side heat exchanger 41; therefore, the refrigerant, having been compressed in the compressor 21 to critical pressure or greater, does not flow through the refrigerant communication pipes 6, 7 and the first utilization-side heat exchanger 41 while still at a high pressure. Therefore, the refrigerant communication pipes 6, 7 and the first utilization-side heat exchanger 41 can be designed based on the pressure after the refrigerant is reduced in pressure by the second connection mechanism 28, rather than being designed based on the pressure to which the refrigerant is compressed by the compressor 21, and as a result, an increase in the thickness of the refrigerant communication pipes 6, 7 and the first utilization-side heat exchanger 41 is reduced.

<Heat Delivery Medium Circuit>

Next, the heat delivery medium circuit 11 of the air conditioning system I will be described.

The heat delivery medium circuit 11 has mainly the second heat source-side heat exchanger 23, a medium tank 32, a medium pump 33, a second utilization-side heat exchanger 51, and the medium communication pipes 8, 9, wherein water is used as the heat delivery medium.

The medium tank 32 is a container for retaining the heat delivery medium subjected to heat exchange with the refrigerant in the second heat source-side heat exchanger 23, and the inlet of the medium tank 32 is connected to one end 23c of the second heat source-side heat exchanger 23.

The medium pump 33 is a pump for circulating the heat delivery medium in the heat delivery medium circuit 11, the pump being rotatably driven by a drive mechanism such as a motor, and the medium pump 33 is connected so as to pump the heat delivery medium retained in the medium tank 32 to the second utilization-side heat exchanger 51 through the medium communication pipe 8.

The second utilization-side heat exchanger 51 is a heat exchanger that can heat a room by using the heat delivery medium subjected to heat exchange in the second heat source-side heat exchanger 23, wherein one end 51a is connected to the discharge side of the medium pump 33 via the medium communication pipe 8, and the other end 51b is connected to the other end 23d of the second heat source-side heat exchanger 23 via the medium communication pipe 9.

The medium communication pipes 8, 9 are medium pipes that are mounted on-site when installed in the location where the air conditioning system 1 is installed.

<Heat Source Unit>

The heat source unit 2 is installed outdoors, for example, and housed within the unit are mainly the compressor 21, the first heat source-side heat exchanger 22, the second heat source-side heat exchanger 23, the connection mechanism 24 (specifically, the four-way switching valve 27 and the expansion mechanisms 29, 30, 31), the medium tank 32, and the medium pump 33. The medium tank 32 and the medium pump 33 may also be housed within a separate unit other than the heat source unit 2.

<Utilization Unit>

The utilization unit 4 is installed in the surface of a wall or ceiling of a room, for example, and housed within the unit are mainly the first utilization-side heat exchanger 41 and an air-blowing fan (not shown).

<Indoor Heating Unit>

The indoor heating unit 5 is installed below the floor, for example, and is a so-called floor heating device having mainly the second utilization-side heat exchanger 51 as underfloor heating tubes, and a heat transfer panel (not shown) provided on the floor surface. The indoor heating unit 5 is not limited to this type of floor heating device, and may also be, e.g., a fan coil unit disposed in a wall or ceiling of a room (in this case, the second utilization-side heat exchanger 51 functions as a heat transfer tube coil), or a radiator installed in a wall of a room (in this case, the second utilization-side heat exchanger 51 functions as a radiator heat exchanger).

(2) Action of Air Conditioning System

Figure 2:
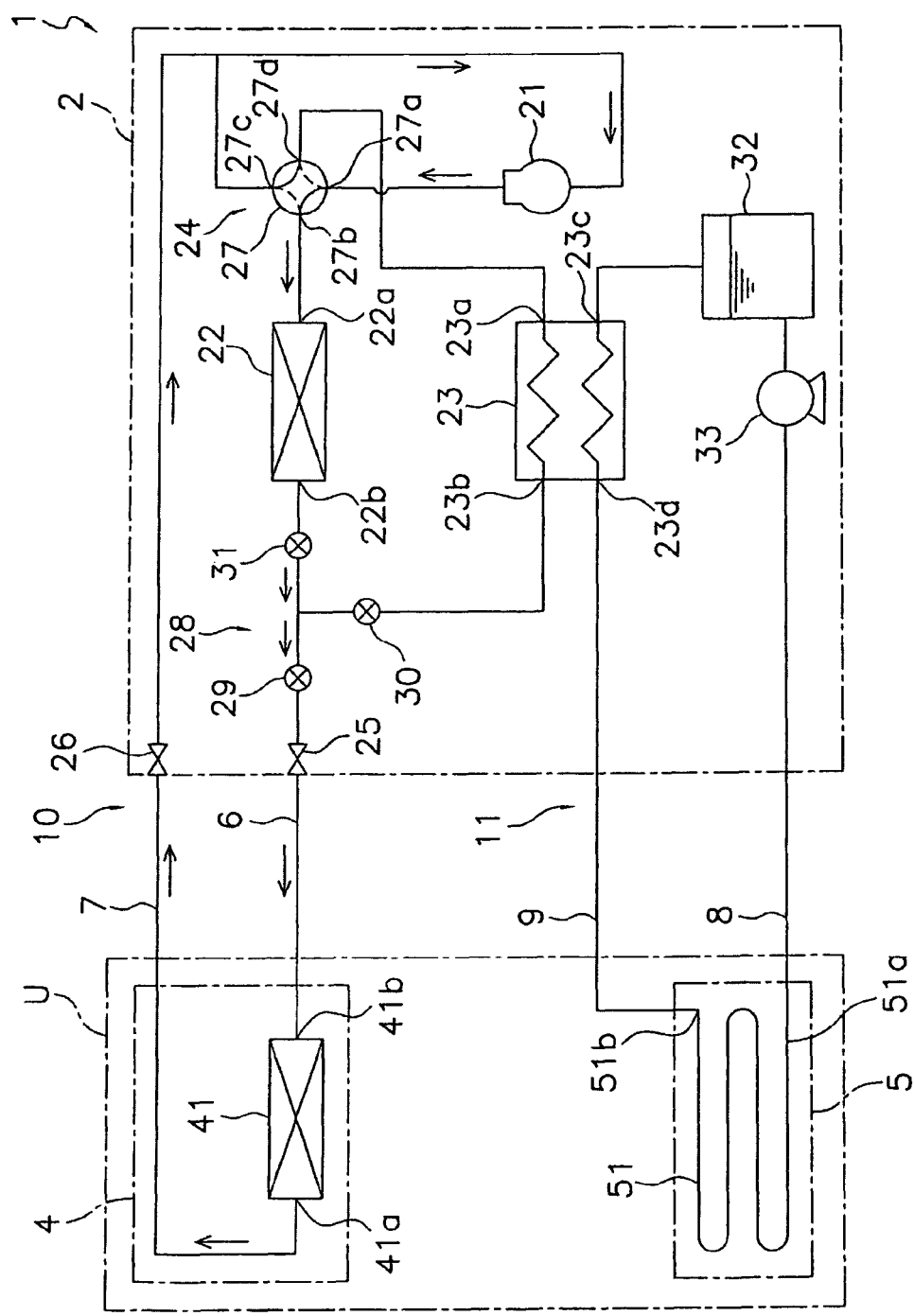
FIG. 2 is a schematic block diagram showing the action of the air conditioning system during the cooling operation.
Figure 3:
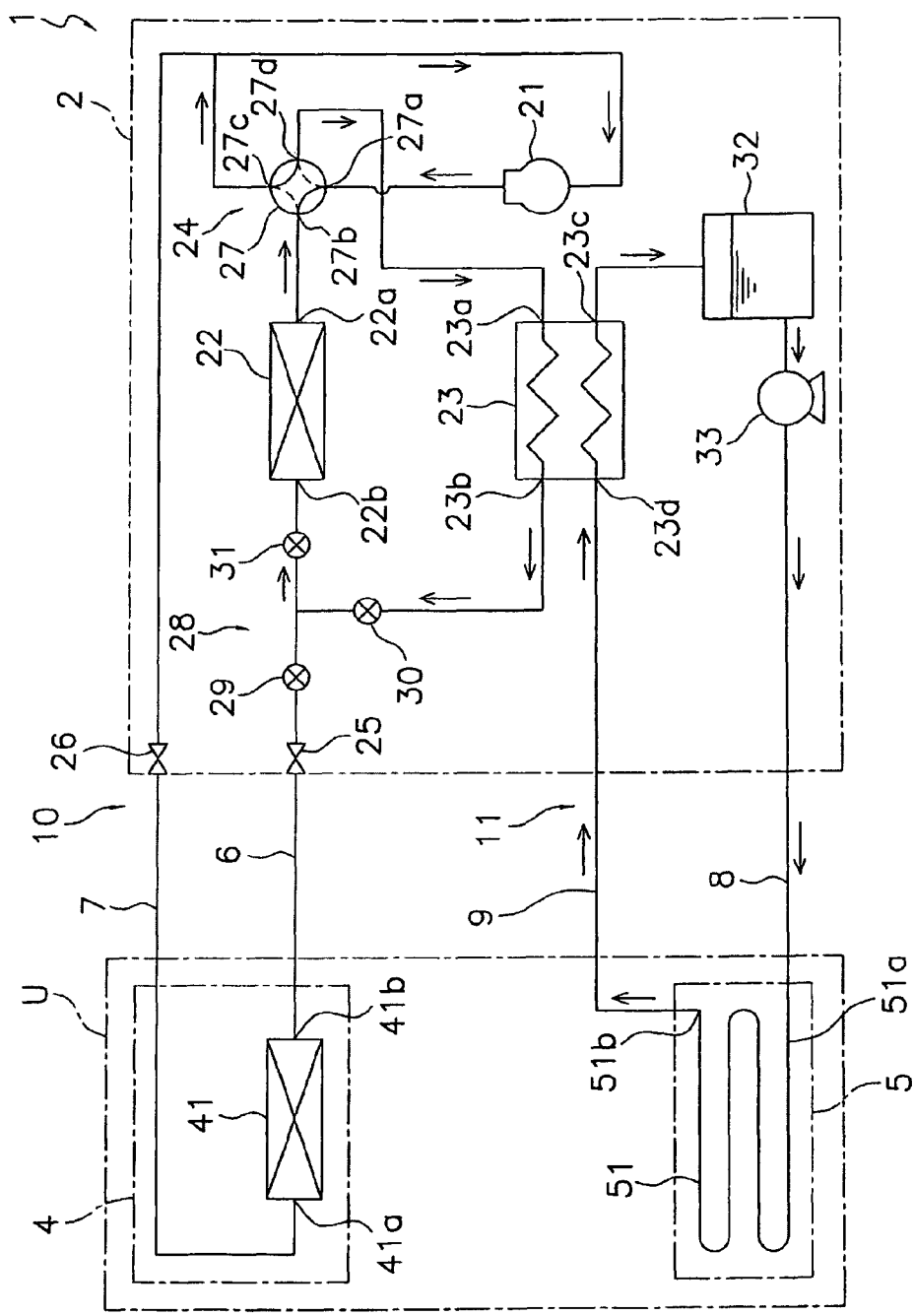
FIG. 3 is a schematic block diagram showing the action of the air conditioning system during the heating operation.

Next, the action of the air conditioning system 1 of the present embodiment during the cooling and heating operations will be described using FIGS. 2 and 3. FIG. 2 is a schematic block diagram showing the action of the air conditioning system 1 during the cooling operation. FIG. 3 is a schematic block diagram showing the action of the air conditioning system 1 during the heating operation.

<Cooling Operation>

First, in the refrigerant circuit 10, the shut-off valves 25, 26 are fully opened, and the connection mechanism 24 is then set to the first connection state. Specifically, the four-way switching valve 27 as the first connection mechanism is set to the first switching state (refer to the solid lines in the four-way switching valve 27 in FIG. 2), the second connection mechanism 28 is set to the first pressure reduction state (specifically, the first expansion mechanism 29 and the third expansion mechanism 31 are opened and the second expansion mechanism 30 is fully closed), and the second heat source-side heat exchanger 23 is not used. The heat delivery medium circuit 11 is not used, either.

When the compressor 21 is driven while the refrigerant circuit 10 is in this state, the refrigerant drawn into the compressor 21 is compressed to critical pressure or greater in the compressor 21.

This high-pressure refrigerant flows through the four-way switching valve 27 into the first heat source-side heat exchanger 22, where the refrigerant is cooled by heat exchange with air or water as the heat source in the first heat source-side heat exchanger 22.

The refrigerant cooled in the first heat source-side heat exchanger 22 is reduced in pressure in the third expansion mechanism 31 and the first expansion mechanism 29, resulting in a low-pressure refrigerant. When the refrigerant is reduced in pressure, the pressure reduction occurs in two stages sequentially in the third expansion mechanism 31 and the first expansion mechanism 29; therefore, there is little noise in each of the expansion mechanisms 29, 31, and the durability of the expansion mechanisms 29, 31 is improved.

The low-pressure refrigerant, having been reduced in pressure in the expansion mechanisms 29, 31, then exits the heat source unit 2 to be sent to the utilization unit 4 through the refrigerant communication pipe 6.

The low-pressure refrigerant sent to the utilization unit 4 flows into the first utilization-side heat exchanger 41 and is heated and evaporated by cooling being performed in the room.

The low-pressure refrigerant heated and evaporated in the first utilization-side heat exchanger 41 exits the utilization unit 4 to be sent to the heat source unit 2 through the refrigerant communication pipe 7.

The low-pressure refrigerant sent to the heat source unit 2 returns to the intake side of the compressor 21.

The cooling operation is performed by performing such a refrigeration cycle operation.

<Heating Operation>

First, in the refrigerant circuit 10, the shut-off valves 25, 26 are fully opened, and the connection mechanism 24 is then set to the second connection state. Specifically, the four-way switching valve 27 as the first connection mechanism is set to the second switching state (refer to the dashed lines in the four-way switching valve 27 in FIG. 3), the second connection mechanism 28 is set to the second pressure reduction state (specifically, the second expansion mechanism 30 and the third expansion mechanism 31 are opened, and the first expansion mechanism 29 is fully closed), and the first utilization-side heat exchanger 41 is not used. In the heat delivery medium circuit 11, the medium pump 33 is driven to circulate the heat delivery medium in the heat delivery medium circuit 11.

When the compressor 21 is driven while the refrigerant circuit 10 is in this state, the refrigerant drawn into the compressor 21 is compressed to critical pressure or greater in the compressor 21.

The high-pressure refrigerant flows into the second heat source-side heat exchanger 23 through the four-way switching valve 27, and the refrigerant is cooled in the second heat source-side heat exchanger 23 by heat exchange with the heat delivery medium.

The refrigerant cooled in the second heat source-side heat exchanger 23 is reduced in pressure in the second expansion mechanism 30 and the third expansion mechanism 31, resulting in a low-pressure refrigerant. When the refrigerant is reduced in pressure, the pressure reduction occurs in two stages sequentially in the second expansion mechanism 30 and the third expansion mechanism 31; therefore, there is little noise in each of the expansion mechanisms 30, 31, and the durability of the expansion mechanisms 30, 31 is improved.

The low-pressure refrigerant, having been reduced in pressure in the expansion mechanisms 30, 31, then flows into the first heat source-side heat exchanger 22, and the refrigerant is heated and evaporated by heat exchange with air or water as the heat source.

The low-pressure refrigerant heated and evaporated in the first heat source-side heat exchanger 22 returns to the intake side of the compressor 21 after having passed through the four-way switching valve 27.

The heat delivery medium heated by heat exchange with the refrigerant in the second heat source-side heat exchanger 23 is temporarily retained in the medium tank 32, and is then increased in pressure by the medium pump 33.

The heat delivery medium increased in pressure by the medium pump 33 then exits the heat source unit 2 to be sent to the indoor heating unit 5 through the medium communication pipe 8.

The heat delivery medium sent to the indoor heating unit 5 flows into the second utilization-side heat exchanger 51 to be cooled by the heating of the room.

The heat delivery medium heated in the second utilization-side heat exchanger 51 then exits the indoor heating unit 5 to be sent to the heat source unit 2 through the medium communication pipe 9.

The heat delivery medium sent to the heat source unit 2 returns to the second heat source-side heat exchanger 23.

The heating operation is formed by performing such a refrigeration cycle operation.

(3) Characteristics of Air Conditioning System

In the air conditioning system 1 of the present embodiment, the room can be cooled while the refrigerant goes back and forth between the heat source unit 2 and the utilization unit 4 via the refrigerant communication pipes 6, 7 by switching the connection mechanism 24 to the first connection state, and the room can be heated while the heat delivery medium, having exchanged heat with the refrigerant, goes back and forth between the heat source unit 2 and the indoor heating unit 5 (specifically, the second utilization-side heat exchanger 51) by switching the connection mechanism 24 to the second connection state. Therefore, the high-pressure refrigerant (carbon dioxide in this case) compressed to critical pressure or greater in the compressor 21 does not need to be sent to the refrigerant communication pipes 6, 7 both even when indoor cooling is being performed and indoor heating is being performed, and an increase in the thickness of the refrigerant communication pipes 6, 7 can be reduced.

Cost increases and loss of workability due to increased thickness in the refrigerant communication pipes can thereby be prevented, cost increases due to loss of workability can also be prevented, and, moreover, comfortable heating can be achieved using the heat delivery medium when indoor heating is being performed.

(4) Modification 1

Figure 4:
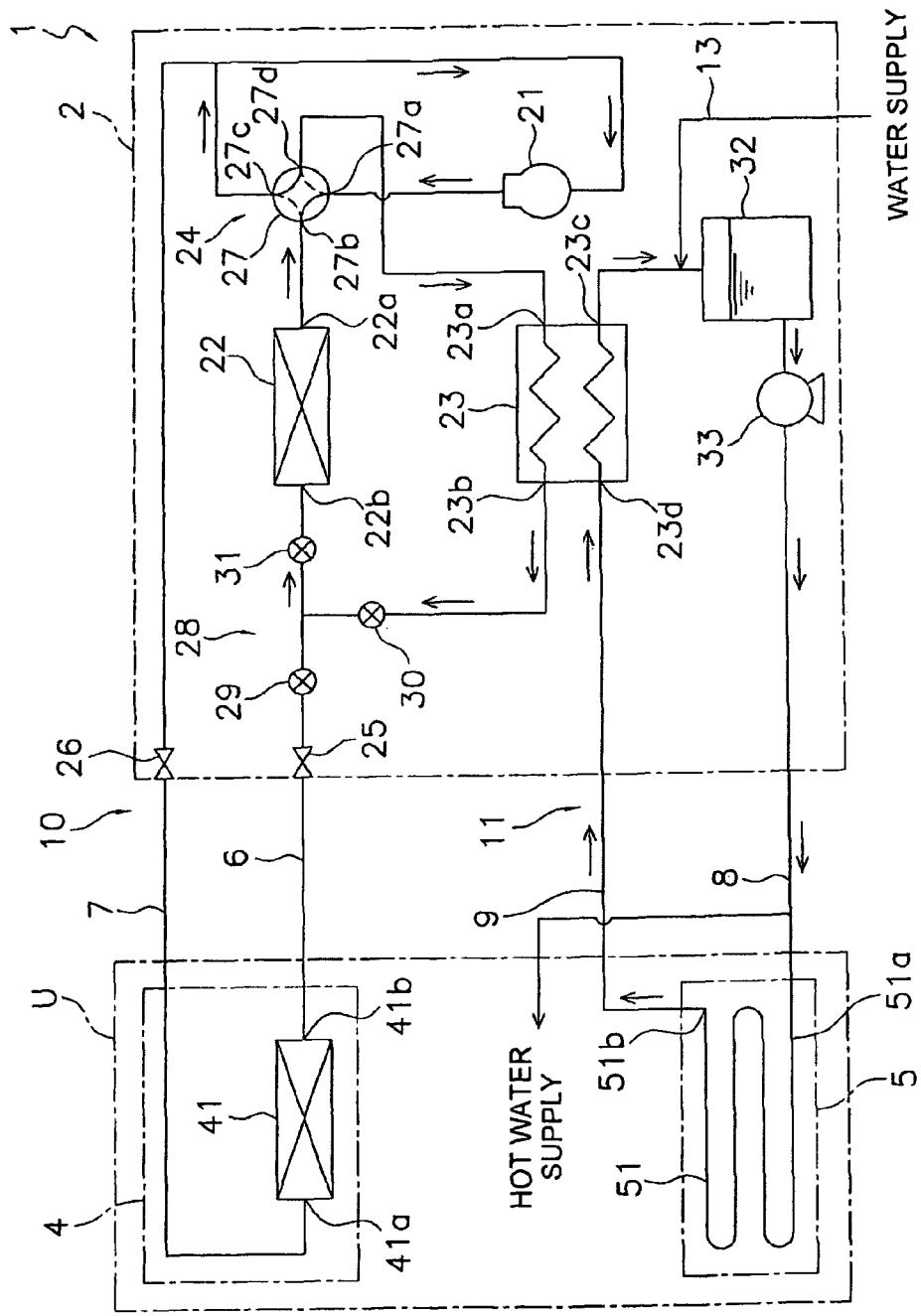
FIG. 4 is a schematic block diagram of an air conditioning system according to Modification 1.

In the embodiment described above, water as the heat delivery medium circulated inside the heat delivery medium circuit 11 is made to flow into the second utilization-side heat exchanger 51 of the indoor heating unit 5 during the heating operation, but another possibility is to divert the water to a hot-water supply pipe 12 before the water flows into the indoor heating unit 5, and to use the water as a hot water supply, as shown in FIG. 4. At this time, the water as a heat delivery medium being used as a hot water supply and flowing out of the heat delivery medium circuit 11 is replenished by connecting a water supply pipe 13 around the medium tank 32 and maintaining a constant water level in the medium tank 32, or by another method.

It is thereby also possible for the water as the heat delivery medium which has exchanged heat with the refrigerant in the second heat source-side heat exchanger 23 to be used as the hot water supply when the connection mechanism 24 is switched to the second connection state to perform the heating operation.

(5) Modification 2

Figure 5:
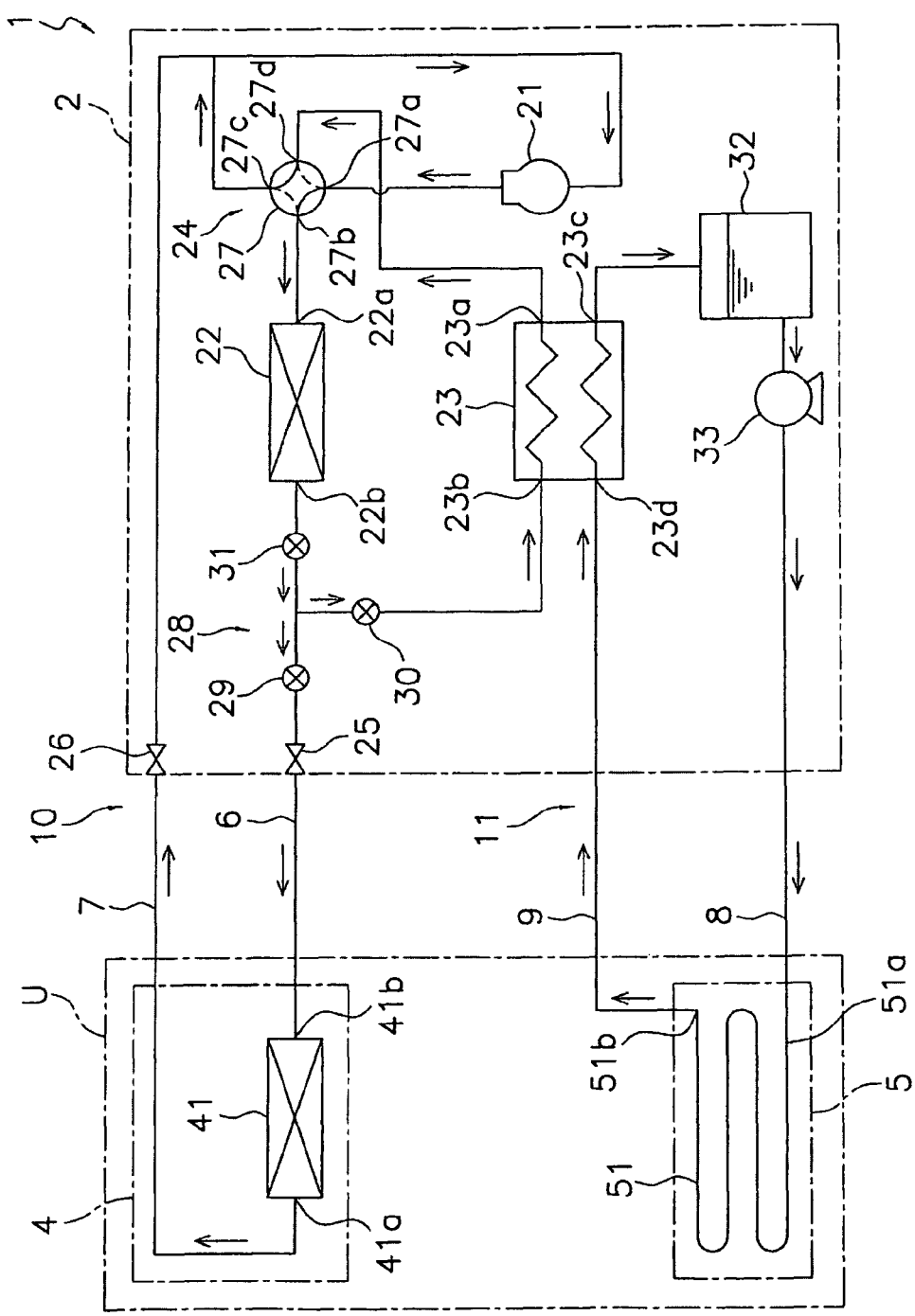
FIG. 5 is a schematic block diagram of an air conditioning system according to Modification 2.

In the embodiment and Modification 1 described above, the heat delivery medium circuit 11 is not used during the cooling operation, but another option, as shown in FIG. 5, is to set the four-way switching valve 27 as the first connection mechanism to the first switching state (refer to the solid lines in the four-way switching valve 27 in FIG. 5), and to switch the second connection mechanism 28 to a third pressure reduction state (specifically, the first expansion mechanism 29, the second expansion mechanism 30, and the third expansion mechanism 31 are all opened) in which the refrigerant cooled in the first heat source-side heat exchanger 22 is reduced in pressure and sent to the first utilization-side heat exchanger 41, and in which the refrigerant that is subjected to heat exchange in the second heat source-side heat exchanger 23 is reduced in pressure and sent to the first heat source-side heat exchanger 22.

The refrigerant discharged from the compressor 21 can thereby be circulated sequentially through the first heat source-side heat exchanger 22, the first utilization-side heat exchanger 41, and the compressor 21, and the refrigerant discharged from the compressor 21 can also be circulated sequentially through the first heat source-side heat exchanger 22, the second heat source-side heat exchanger 23, and the compressor 21. The medium pump 33 is driven and the heat delivery medium in the heat delivery medium circuit 11 is circulated while the refrigerant circuit 10 is in this state. It is thereby made possible to perform indoor cooling by using the utilization unit 4 (i.e., the first utilization-side heat exchanger 41) and to perform indoor cooling by using the indoor heating unit 5 (i.e., the second utilization-side heat exchanger 51) to increase variations in cooling.

Industrial Applicability

If the present invention is used, it is possible to suppress increases in the thickness of refrigerant communication pipes in an air conditioning system capable of using a refrigeration cycle in which a refrigerant is compressed to critical pressure or greater, and switching between indoor heating and cooling.

What is claimed is:

1. An air conditioning system being configured to switch between indoor heating and cooling, the air conditioning system comprising:
   a compressor being configured to compress a refrigerant to critical pressure or greater;
   a first heat source-side heat exchanger being configured to heat or to cool the refrigerant;
   a second heat source-side heat exchanger being configured to exchange heat between the refrigerant and a heat delivery medium;
   a first utilization-side heat exchanger being configured to perform indoor cooling by using the refrigerant cooled in the first heat source-side heat exchanger;
   a second utilization-side heat exchanger being configured to perform indoor heating by using the heat delivery medium subjected to heat exchange in the second heat source-side heat exchanger; and
   a connection mechanism being configured to switch between a first connection state in which the refrigerant discharged from the compressor is circulated sequentially through the first heat source-side heat exchanger, the first utilization-side heat exchanger, and the compressor, and a second connection state in which the refrigerant discharged from the compressor is circulated sequentially through the second heat source-side heat exchanger, the first heat source-side heat exchanger, and the compressor, the compressor, the first heat source-side heat exchanger, the second heat source-side heat exchanger, and the connection mechanism constituting a heat source unit, the first utilization-side heat exchanger constituting a utilization unit, and the utilization unit and heat source unit being connected via refrigerant communication pipes.

2. The air conditioning system as recited in claim 1, wherein the connection mechanism has a first connection mechanism and a second connection mechanism, the first connection mechanism is configured to switch between a first switching state in which the discharge side of the compressor and one end of the first heat source-side heat exchanger are connected and the intake side of the compressor and one end of the first utilization-side heat exchanger are connected in the first connection state, and a second switching state in which the discharge side of the compressor and one end of the second heat source-side heat exchanger are connected and the intake side of the compressor and the one end of the first heat source-side heat exchanger are connected in the second connection state, and the second connection mechanism is configured to switch between a first pressure reduction state in which the refrigerant cooled in the first heat source-side heat exchanger is reduced in pressure and sent to the first utilization-side heat exchanger in the first connection state, and a second pressure reduction state in which the refrigerant subjected to heat exchange in the second heat source-side heat exchanger is reduced in pressure and sent to the first heat source-side heat exchanger in the second connection state.

3. The air conditioning system as recited in claim 2, wherein the first connection mechanism is configured to switch to the first switching state and the second connection mechanism is configured to switch to a third pressure reduction state in which the refrigerant cooled in the first heat source-side heat exchanger is reduced in pressure and sent to the first utilization-side heat exchanger, and in which the refrigerant subjected to heat exchange in the first heat source-side heat exchanger is reduced in pressure and sent to the second heat source-side heat exchanger.

4. The air conditioning system as recited in claim 3, wherein the heat delivery medium is water.

5. The air conditioning system as recited in claim 4, wherein the refrigerant is carbon dioxide.

6. The air conditioning system as recited in claim 3, wherein the refrigerant is carbon dioxide.

7. The air conditioning system as recited in claim 2, wherein the heat delivery medium is water.

8. The air conditioning system as recited in claim 7, wherein the refrigerant is carbon dioxide.

9. The air conditioning system as recited in claim 2, wherein the refrigerant is carbon dioxide.

10. The air conditioning system as recited in claim 1, wherein the heat delivery medium is water.

11. The air conditioning system as recited in claim 10, wherein the refrigerant is carbon dioxide.

12. The air conditioning system as recited in claim 1, wherein the refrigerant is carbon dioxide.

* * * * *